United States Patent Office 3,290,272
Patented Dec. 6, 1966

3,290,272
POLYSULFONES
Floyd L. Ramp, West Richfield, and Louis E. Trapasso, Maple Heights, Ohio, assignors to The B. F. Goodrich Company, New York, N.Y., a corporation of New York
No Drawing. Filed Dec. 7, 1962, Ser. No. 242,926
4 Claims. (Cl. 260—79.3)

This invention relates to a unique resinous polysulfone and more particularly relates to a polysulfone prepared from bicyclo-[2,2,1]-2,5-heptadiene (norbornadiene) and sulfur dioxide.

It is known that polymeric sulfones with good thermal stability and fiber-forming properties may be obtained by oxidizing polymeric sulfides to the corresponding polymeric sulfones if the oxidation of said sulfides is effected by employing a peroxide compound, such as hydrogen peroxide of 30% to 90% strength as the oxidizing agent in a solvent medium comprising concentrated formic acid. A simpler, more economic route to the polymeric sulfones would be desirable.

Polysulfones obtained by copolymerization of sulfur dioxide (a very low cost monomer) with olefins are generally alternating copolymers containing a gamma disulfone repeating unit. Copolymers of sulfur dioxide with conjugated dienes are found to be vinylogs of polymeric gamma disulfones. These polymeric disulfones have the undesirable properties of being thermally unstable and alkali sensitive. Polysulfones containing more than 2 saturated carbon atoms between the sulfone groups have, however, been shown to be quite stable toward heat and alkali (United States Patent 2,534,366).

It has been speculated that a form of cyclocopolymerization might be effected wherein non-conjugated 1,5,1,6 and higher dienes might be copolymerized with sulfur dioxide and hence produce a chain of more than 2 saturated carbon atoms between the sulfone groups. Experiments with bimethallyl, diallyl ether and 4-vinyl-1-cyclohexene indicate, however, that the non-conjugated double bonds evidently react independently and the resulting materials are again cross-linked and alkali sensitive.

We have surprisingly found that a thermally initiated copolymerization of sulfur dioxide and norbornadiene occurs predominantly by 1,5 homo-conjugative addition and forms a thermally stable, alkali resistant polysulfone. Our discovery is even more surprising in view of the fact that low temperature, free radical initiated copolymerization of sulfur dioxide and norbornadiene produces mainly a 1,2 addition repeating unit resulting in an alkali sensitive, thermally unstable polysulfone.

The polymerization of sulfur dioxide and norbornadiene can be conducted by direct contact, as by bubbling the gaseous dioxide through the liquid diene. For ease of handling, however, it is preferable to mix the diene with an amount of a liquid organic medium such as hexane, dimethyl sulfolane, dioxane and the like.

In the examples given below alkali resistance is determined by heating a 0.1–0.3 gram sample of the white polymer obtained in 5% aqueous sodium hydroxide at 60° C. for 3 hours. Alkali sensitivity is indicated by discoloration of the sample and extreme alkali sensitivity is shown if the sample dissolves.

$T_1$ and $T_2$ dynamic extrusion values were measured in a dynamic extrusion rheometer. In the operation of this instrument a granular polymer sample is placed in a chamber under a plunger comprising a load of 3263 lbs./in.$^2$. The sample is gradually heated to effect its ultimate extrusion through an orifice 0.0625 inch in diameter. Plunger advance and temperature increase are periodically measured. Their plot provides a curve whose interpretation enables the calculation of $T_1$ and $T_2$ values where $T_1$ is related to the second order transition temperature and $T_2$ is related to the softening point of the polymer.

Thermal stability of the samples is evaluated in a pellet press consisting of a cylindrical die that can be heated and cooled while held in the press at pressures up to 10,000 p.s.i. The die is preheated to a selected temperature and 2.0 grams of powdered polymer is added. About 5,000 p.s.i. pressure is applied to the sample and then released. This step is repeated three times to remove any voids in the sample. Pressure of 10,000 p.s.i. is applied and held for 2 minutes and then the die is cooled for 20–30 minutes. The pressure is released and the pellet removed for observation. Dark pellets indicate lack of thermal stability. If no pellet has formed, the test is repeated at a higher temperature. The temperature at which a light colored or colorless pellet forms is taken as the top of the thermally stable range of the material.

Infrared analysis of these copolymers show a peak at about 13.9 microns which is indicative of 1,2 addition and the presence of unreacted double bonds in the polymer. If this peak is small, it is evidence that the predominant addition has been 1,5 in nature, that the double bonds are virtually all reacted, and that the polymer can be expected to be thermally stable and alkali insensitive.

The main part of our invention having been described, the following examples are presented for its further description and illustration:

Examples I–III

Distilled bicycloheptadiene (3/32 mol) was charged into a polymerization tube flushed with nitrogen. Cold, distilled $SO_2$ (4/32 mol, B.P.—10° C.) was added and the tube was again flushed with nitrogen and sealed. Ethanolic silver nitrate (0.08 g. in 2% solution) was next charged to the tube by means of a hypodermic syringe and polymerization was conducted at 4° C. The polymer formed was filtered, water washed to remove silver nitrate and dried overnight in a vacuum oven at 100° C. The procedure was run several times, producing the data summarized in the table below:

TABLE 1

| Example | Diene, mols | $SO_2$, mols | $AgNO_3$, mols | Solvent | Temp., °C. | Time, hours | Comment |
|---|---|---|---|---|---|---|---|
| I | 3/32 | 4/32 | 1/2000 | None | 4 | 96 | Button pressed at 260° C., very dark, very brittle extremely alkali sensitive. |
| II | 3/32 | 4/32 | 1/2000 | n-Hexane | 4 | 48 | Fused at 200° C., very dark, very brittle, extremely alkali sensitive. |
| III | 3/32 | 4/32 | 1/2000 | Tetrahydrofuran | 4 | 48 | Dissolves in dilute alkali. |

Examples IV–VIII

A 300 ml. stainless steel autoclave was purged with nitrogen. Bicyclo [2,2,1]-2,5-heptadiene was added to 200 ml. of solvent in the autoclave. Sulfur dioxide was added by distillation from gas cylinder and the autoclave was sealed and heated to 150° C. or higher, generally for 3 hours. Solid white products were obtained which assumed a powder form when dried. Time, temperature, solvent, and monomer charge ratio were varied to produce the data in Table 2. The most alkali resistant product was obtained by thermal initiation with large excess of sulfur dioxide.

TABLE 2

| Example | Diene, mols | $SO_2$, mols | Solvent | Temp., °C. | Time, hours | Comment |
|---|---|---|---|---|---|---|
| IV | 3/32 | 12/32 | n-Hexane | 150 | 3 | $T_1=257°$ C., $T_2=301°$ C. Alkali insensitive. |
| V | 3/32 | 9/32 | ----do---- | 150 | 18 | $T_1=257°$ C., $T_2=302°$ C. Alkali insensitive. I.R. peak at 13.9—small. |
| VI | 3/32 | 9/32 | ----do---- | 150 | 3 | $T_1=249°$ C., $T_2=301°$ C. Alkali insensitive. I.R. peak at 13.9—small. |
| VII | 3/23 | 9/32 | Dioxane | 200 | 3 | $T_1=79°$ C., $T_2=119°$ C. Alkali insensitive. I.R. peak at 13.9—small. |
| VIII | 3/32 | 1/32 | n-Hexane | 150 | 3 | Fuses at 160° C. Alkali insensitive. I.R. peak at 13.9—small. |

The copolymer of Example IV was submitted for micro analysis of carbon, hydrogen and sulfur and the results compared to theoretical analyses clearly indicate that the copolymer of this invention is essentially in the 1:1 alternating form indicative of 1,5 addition rather than in the 2:1 form indicative of 1,2 addition.

TABLE 3

| Example IV | | Theoretical 1:1 copolymer | Theoretical 2:1 copolymer |
|---|---|---|---|
| Percent C | 53.1 | 53.82 | 38.13 |
| Percent H | 5.42 | 5.17 | 3.63 |
| Percent S | 19.34 | 20.53 | 29.05 |
| Thermal stability | Good | Good | Poor |
| Alkali sensitivity | Good | Good | Poor |

Example V indicates that long heating has no effect on the copolymer formed. It is very heat stable. Examples VII and VIII indicate that varying the solvent from hexane, and lowering the proportion of $SO_2$ charged do detract from thermal stability, but no particularly from alkali insensitivity of the polymers. Example VII further shows that polymerization temperatures up to 200° C. do not detract from the alkali insensitivity.

These new thermally initiated copolymers can be plasticized with monomeric sulfones and molded into buttons or other desirable and useful shapes. They are extremely useful for forming plastic molded parts that will be exposed to heat, alkalinity, hydrocarbon solvents and the majority of inorganic solvents. The only successful solvents found for these materials are concentrated sulfuric acid and phosphoric acid.

We claim:
1. The process of forming an alkali insensitive sulfone polymer by thermal initiation at 100°–200° C. of polymerization between about 1 mol of monomeric bicyclo [2,2,1]-2,5-heptadiene and about 1–4 mols of monomeric sulfur dioxide, said polymerization being continued for a period of 3–18 hours.
2. The process of claim 1 conducted in an organic liquid medium selected from the class consisting of hexane, dimethyl sulfolane and dioxane.
3. The process of claim 2 wherein the organic liquid medium is n-hexane.
4. The alkali insensitive resinous copolymer compositions formed by the thermally initiated at 100°–200° C. copolymerization of about 1–4 mols of sulfur dioxide and about 1 mol of bicyclo[2,2,1]-2,5-heptadiene for 3 to 18 hours.

References Cited by the Examiner

UNITED STATES PATENTS

| 2,258,702 | 10/1941 | Frey | 260—79.3 |
| 2,930,781 | 3/1960 | Schmerling | 260—88.2 |
| 2,930,782 | 3/1960 | Schmerling | 260—88.2 |
| 3,133,903 | 5/1964 | Frazer | 260—88.2 |

OTHER REFERENCES

Frederick et al.: Journal American Chemical Society, vol. 56, pp. 1815–1819 (1954).

JOSEPH L. SCHOFER, *Primary Examiner.*

JAMES A. SEIDLECK, *Examiner.*

D. K. DENENBERG, J. F. McNALLY,
*Assistant Examiners.*